(12) United States Patent
Lee et al.

(10) Patent No.: US 6,710,937 B2
(45) Date of Patent: Mar. 23, 2004

(54) ZOOMING STRUCTURE IN BARREL ASSEMBLY OF ZOOM CAMERA

(75) Inventors: Seon-ho Lee, Changwon (KR); Nae-jin Jo, Changwon (KR)

(73) Assignee: Samsung Techwin Co., Ltd., Kyongsangnam-do (KR)

(*) Notice: Subject to any disclaimer, the term of this patent is extended or adjusted under 35 U.S.C. 154(b) by 272 days.

(21) Appl. No.: 09/903,594

(22) Filed: Jul. 13, 2001

(65) Prior Publication Data

US 2002/0030896 A1 Mar. 14, 2002

(30) Foreign Application Priority Data

Jul. 29, 2000 (KR) ............................ 2000-44040

(51) Int. Cl.[7] .............................................. G02B 15/14
(52) U.S. Cl. ...................... 359/699; 359/701; 359/704
(58) Field of Search ................................. 359/699, 700, 359/701, 703, 704, 705, 706; 396/72

(56) References Cited

U.S. PATENT DOCUMENTS 6,204,977 B1 * 3/2001 Iwasa ........................ 359/700
6,268,968 B1 * 7/2001 Iwasa ........................ 359/699
6,462,887 B1 * 10/2002 Kim et al. .................. 359/701
6,516,148 B1 * 2/2003 Kim et al. .................. 396/72

* cited by examiner

Primary Examiner—Huy Mai
(74) Attorney, Agent, or Firm—Finnegan, Henderson, Farabow, Garrett & Dunner, LLP

(57) ABSTRACT

A barrel assembly of a zoom camera includes a front lens frame where a front lens group is installed, a front guide frame for supporting the front lens frame, a zoom ring advancing and retreating along an optical axis of the front lens group, an inner helicoid ring installed to be capable of advancing and retreating with respect to the zoom ring, a rear lens frame where a rear lens group which is arranged on the same optical axis as the front lens group is installed, and a cam unit formed at the zoom ring and an inner rotator which is installed at the inner helicoid ring to be capable of advancing and retreating, for adjusting the interval between the front lens group and the rear lens group as the front lens group moves.

17 Claims, 8 Drawing Sheets

US 6,710,937 B2

ZOOMING STRUCTURE IN BARREL ASSEMBLY OF ZOOM CAMERA

BACKGROUND OF THE INVENTION

1. Field of the Invention

The present invention relates to a zoom camera, and more particularly, to a barrel assembly of a zoom camera in which the structure of a barrel for zooming is improved.

2. Description of the Related Art

A zoom lens of a camera has a lens structure which enables photographing an object at a different magnifying power by changing a focal length within a predetermined range. The lens structure has a front lens group mainly having a positive power and a rear lens group mainly having a negative power. Zooming is achieved as the distance between the front and rear lens groups and the distance between the lens groups and a film surface fixed to a camera body are changed by making these lens groups to move relatively.

In the lens structure with two lens groups like the above case, a front lens frame of the front lens group is installed at a zoom ring and moves by cam coupling or helicoid coupling to a cam barrel having a cam groove. A rear lens frame where the rear lens group is installed is moved along a cam groove formed at the cam barrel. Thus, when the lens groups are moved for zooming from a wide mode to a television mode and vice versa, the interval between the front lens frame and the rear lens frame changes due to backlash so that a photograph taken may be unclear.

On focusing in the above-described zoom lens structure, the backlash is compensated for by moving the front lens group by using a motor installed at a shutter block. However, in the above structure, processing the cam barrel is difficult and the structure of the barrel of a zoom camera is complicated, so that miniaturization of the zoom camera is difficult. Thus, a zoom lens structure is needed in which miniaturization of a zoom camera is possible while maintaining a high magnifying power and a point of inflection is not generated when the lens groups move.

SUMMARY OF THE INVENTION

To meet the above needs, it is an object of the present invention to provide a barrel assembly suitable for a zoom camera having a high magnifying power, in which a zoom action is performed by forming a cam at a zoom ring that is a member linearly moving at the tip portion of the barrel, so that an unsmooth zoom action due to the overload to the cam during the zoom action at the point of inflection is prevented.

Accordingly, to achieve the above object, there is provided a barrel assembly of a zoom camera includes a front lens frame where a front lens group is installed, a front guide frame for supporting the front lens frame, a zoom ring advancing and retreating along an optical axis of the front lens group, an inner helicoid ring installed to be capable of advancing and retreating with respect to the zoom ring, a rear lens frame where a rear lens group which is arranged on the same optical axis as the front lens group is installed, and a cam unit formed at the zoom ring and an inner rotator which is installed at the inner helicoid ring to be capable of advancing and retreating, for adjusting the interval between the front lens group and the rear lens group as the front lens group moves.

To achieve the above object, there is provided a barrel assembly of a zoom camera comprising a front lens frame where a front lens group is installed, a front guide frame for supporting the front lens frame, a zoom ring having a cam portion formed along an end portion of the zoom ring, a rear lens frame where a rear lens group arranged on the same optical axis as the front lens group, an inner helicoid ring coupled to the zoom ring by an advancing and retreating unit, an inner rotator advancing and retreating in a lengthwise direction by a guide unit along the inner circumferential surface of the inner helicoid ring, a cam unit, installed at the outer circumferential surface of the inner rotator and the zoom ring, for advancing and retreating the inner rotator during rotation of the inner helicoid ring, and including a coupling unit formed on the inner circumferential surface of the inner rotator and the outer circumferential surface of the rear lens frame, for advancing and retreating the rear lens frame during the rotation of the inner rotator, and an inner guide ring, coupled to the front guide frame and the rear lens frame to be capable of sliding, for preventing the front guide frame and the rear lens frame from rotating.

To achieve the above object, there is provided a barrel assembly of a zoom camera comprising a front lens frame where a front lens group is installed, a front guide frame for supporting the front lens frame, a zoom ring having a cam portion formed along an end portion of the zoom ring, a rear lens frame where a rear lens group arranged on the same optical axis as the front lens group, an inner helicoid ring coupled to the zoom ring by an advancing and retreating unit, an inner rotator advancing and retreating in a lengthwise direction by a first guide unit along the inner circumferential surface of the inner helicoid ring, a cam unit, installed at the outer circumferential surface of the inner rotator and the zoom ring, for advancing and retreating the inner rotator during rotation of the inner helicoid ring, and including a coupling unit formed on the inner circumferential surface of the inner rotator and the outer circumferential surface of the rear lens frame, for advancing and retreating the rear lens frame during the rotation of the inner rotator, and an inner guide ring, coupled to the front guide frame and the rear lens frame to be capable of sliding, for preventing the front guide frame and the rear lens frame from rotating, a guide ring coupled to the inner guide ring to be capable of advancing and retreating by a second guide unit, a helicoid ring in which the guide ring is rotatably inserted and coupled to the inner helicoid ring by a third guide unit, for advancing and retreating the inner helicoid ring while rotating the inner helicoid ring during rotation of the helicoid ring, and a driving unit for driving the helicoid ring.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
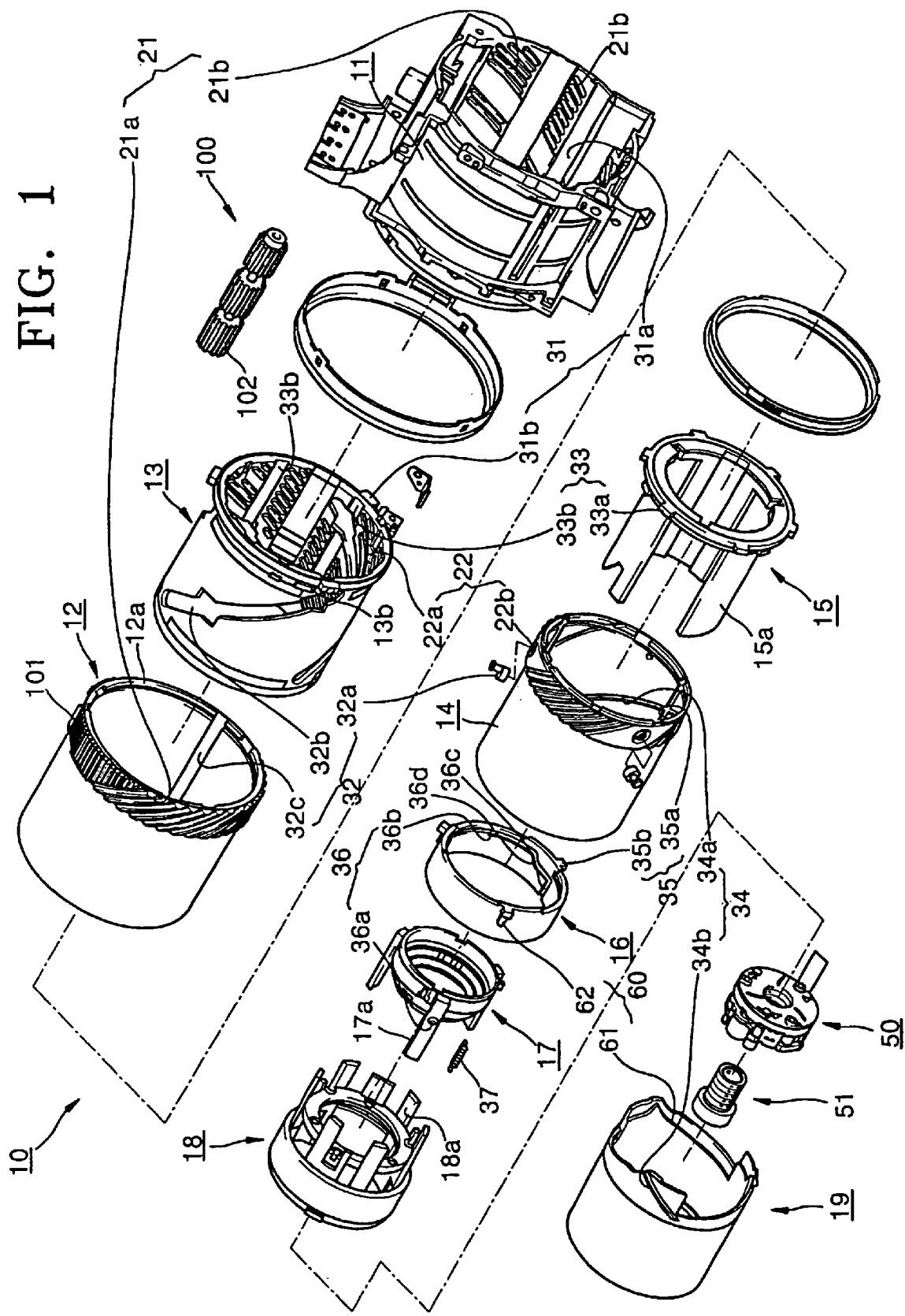
FIG. 1 is an exploded perspective view of a barrel assembly of a zoom camera according to a preferred embodiment of the present invention.
Figure 2:
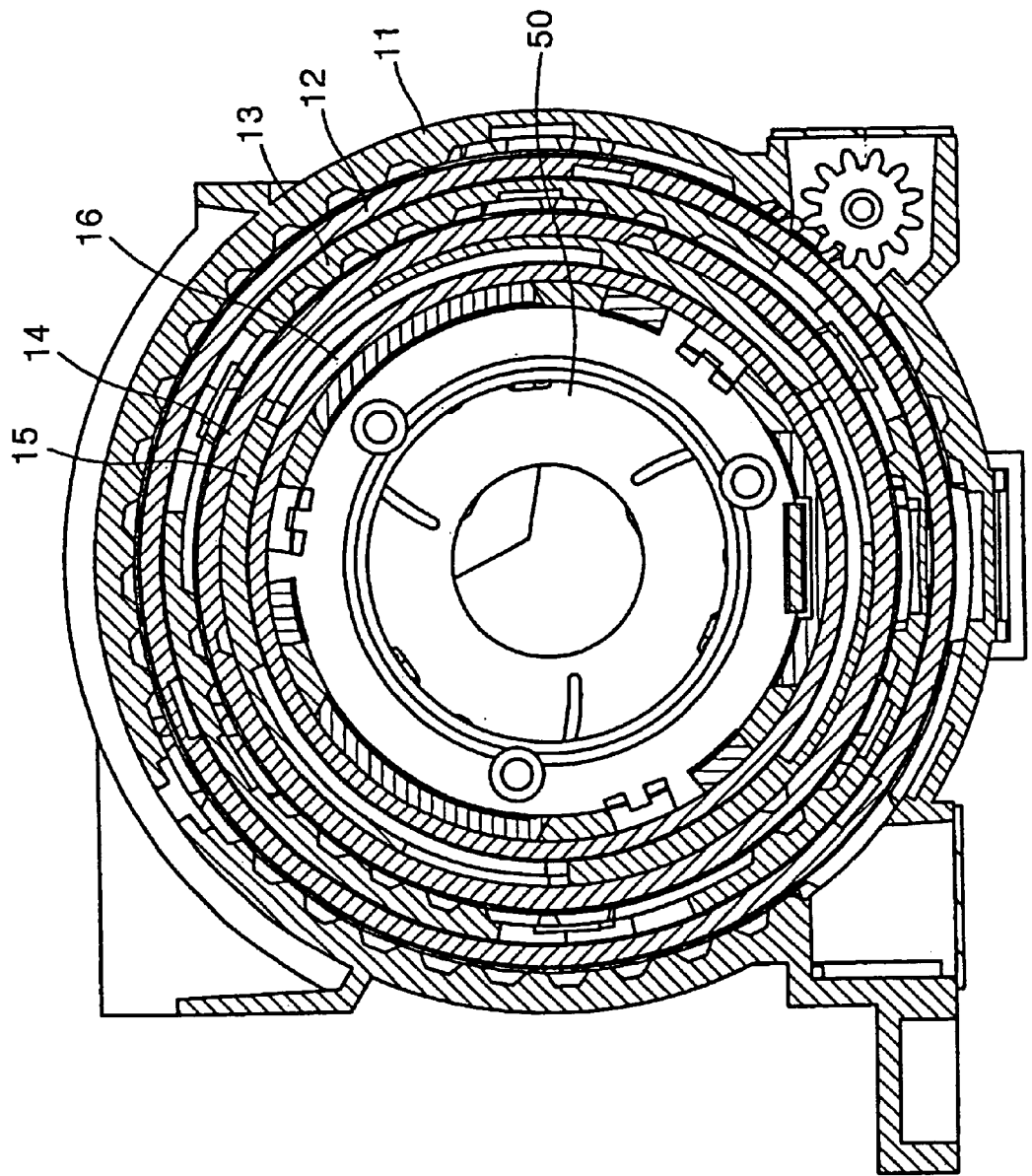
FIG. 2 is a vertical sectional view of the zoom camera of FIG. 1.

Referring to FIGS. 1 through 4, in a barrel assembly of a zoom camera according to a preferred embodiment of the present invention, zooming is performed by relatively moving a front guide frame and a rear lens frame. As shown in the drawings, a barrel assembly 10 of a zoom camera includes a fixed barrel 11 fixed to a main body (not shown) of a camera, a driving unit 100 installed at one side of the fixed barrel 11, and a helicoid ring 12 which is coupled to the fixed barrel 11 by a first advancing and retreating unit 21 and advances and retreats while being rotated by the driving unit 100 in forward and reverse directions.

The first advancing and retreating unit 21 has a helicoid female screw thread 21b formed on the inner circumferential surface of the fixed barrel 11 and a helicoid male screw thread 21a formed at part of the outer circumferential surface of an end portion of the helicoid ring 12 facing a film (not shown) to be engaged with the helicoid female screw thread 21b. A gear portion 101 is formed on the same outer circumferential surface where the helicoid male screw thread 21a of the helicoid ring 12 is formed, and engaged with a gear 102 of the driving unit 100. Here, the length of the gear 102 must be longer than a length corresponding to a stroke distance of the helicoid ring 12 along an optical axis, but a plurality of gears installed at a rotation shaft at a predetermined interval can be used instead. The gear 102 is rotated by a geared motor (not shown) having a deceleration portion.

A guide ring 13 is installed in the helicoid ring 12 and moves linearly along the optical axis with respect to the fixed barrel 11 together with the helicoid ring 12 when the helicoid ring 12 advances and retreats by a first guide unit 31. The helicoid ring 12 and the guide ring 13 are combined as a first circular coupling groove 12a formed along the inner circumferential surface of the helicoid ring 12 is coupled to a coupling protrusion 13b formed along the outer circumferential surface of the guide ring 13 to be capable of relatively rotating.

The first guide unit 31 includes at least one first guide groove 31a formed in the inner circumferential surface of the fixed barrel 11 along the optical axis, and at least one first guide protrusion 31b formed at an end portion of the guide ring 13 facing the film to be coupled to the first guide groove 31a.

An inner helicoid ring 14 is installed in the guide ring 13, which is coupled to a second advancing and retreating unit 22, advances and retreats, and rotates at the same rotation angle as that of the helicoid ring 12, by receiving a rotational force of the helicoid ring 12 via a second guide unit 32.

The second advancing and retreating unit 22 includes a helicoid female screw thread 22a formed on the inner circumferential surface of the guide ring 13 and a helicoid male screw thread 22b having a predetermined width formed on the outer circumferential surface of an end portion of the inner helicoid ring 14 facing the film to be engaged with the helicoid female screw thread 22a. It is obvious that the helicoid male screw thread 22b can be formed on the inner circumferential surface of the guide ring 13 and that the helicoid female screw thread 22a can be formed on the outer circumferential surface of the inner helicoid ring 14.

The second guide unit 32 includes a guide protrusion 32a formed at a portion where the helicoid male screw thread 22b of the inner helicoid ring 14 is formed, a slot 32b formed to be inclined in the outer circumferential surface of the guide ring 13, and a second guide groove 32c formed in the inner circumferential surface of the helicoid ring 12 in a lengthwise direction. The guide protrusion 32a is coupled to the second guide groove 32c by passing through the slot 32b.

An inner guide ring 15 which is arranged to be coaxial with the optical axis and advances and retreats by a third guide unit 33 in a lengthwise direction, is installed in the inner helicoid ring 14. A plurality of first guide pieces 15a are formed at the inner guide ring 15 in a radial direction. The third guide unit 33 includes a plurality of third guide protrusions 33a protruding from the outer circumferential surface of the inner guide ring 15 at a predetermined interval, and a third guide groove 33b formed in the inner circumferential surface of the guide ring 13 in a lengthwise direction. The third guide protrusions 33a are coupled to the third guide groove 33b.

A zoom ring 19 which advances and retreats by a rotational force of the inner helicoid ring 14 by means of a third advancing and retreating unit 34, is installed in the inner helicoid ring 14. A front guide frame 18 is installed at the zoom ring 19. A shutter block 50 to which a front lens frame 51 where a front lens group is installed is helicoid-coupled, is installed at the front guide frame 18. The front lens frame 51 installed at the shutter block 50 moves back and forth by an additional driving unit which is not shown in the drawings.

The third advancing and retreating unit 34 includes a third helicoid female screw thread 34a formed on the inner circumferential surface of the inner helicoid ring 14, and a third helicoid male screw thread 34b formed on the outer circumferential surface of the zoom ring 19. The third helicoid female screw thread 34a is coupled to the third helicoid male screw thread 34b.

An inner rotator 16 which advances and retreats by a fourth guide unit 35 in a lengthwise direction, is installed in the inner helicoid ring 14. A rear lens frame 17 where a rear lens group (not shown) is installed is installed in the inner rotator 16 by a coupling unit 36 to be capable of relatively rotating. The fourth guide unit 35 includes a plurality of fourth guide protrusions 35b formed on the outer circumferential surface of the inner rotator 16 to protrude in a radial direction, and a plurality of fourth guide grooves 35a are formed in the inner circumferential surface of the inner helicoid ring 14 in a lengthwise direction. The fourth guide protrusions 35b is coupled to the fourth guide grooves 35a. Thus, when the inner helicoid ring 14 rotates, the inner rotator 16 rotates together.

The coupling unit 36 includes at least one coupling protrusion 36a formed on the outer circumferential surface of the rear lens frame 17 where the rear lens group is installed, and a cam groove 36b formed in the inner circumferential surface of the inner rotator 16. The coupling protrusion 36a is coupled to the cam groove 36b.

Figure 7:
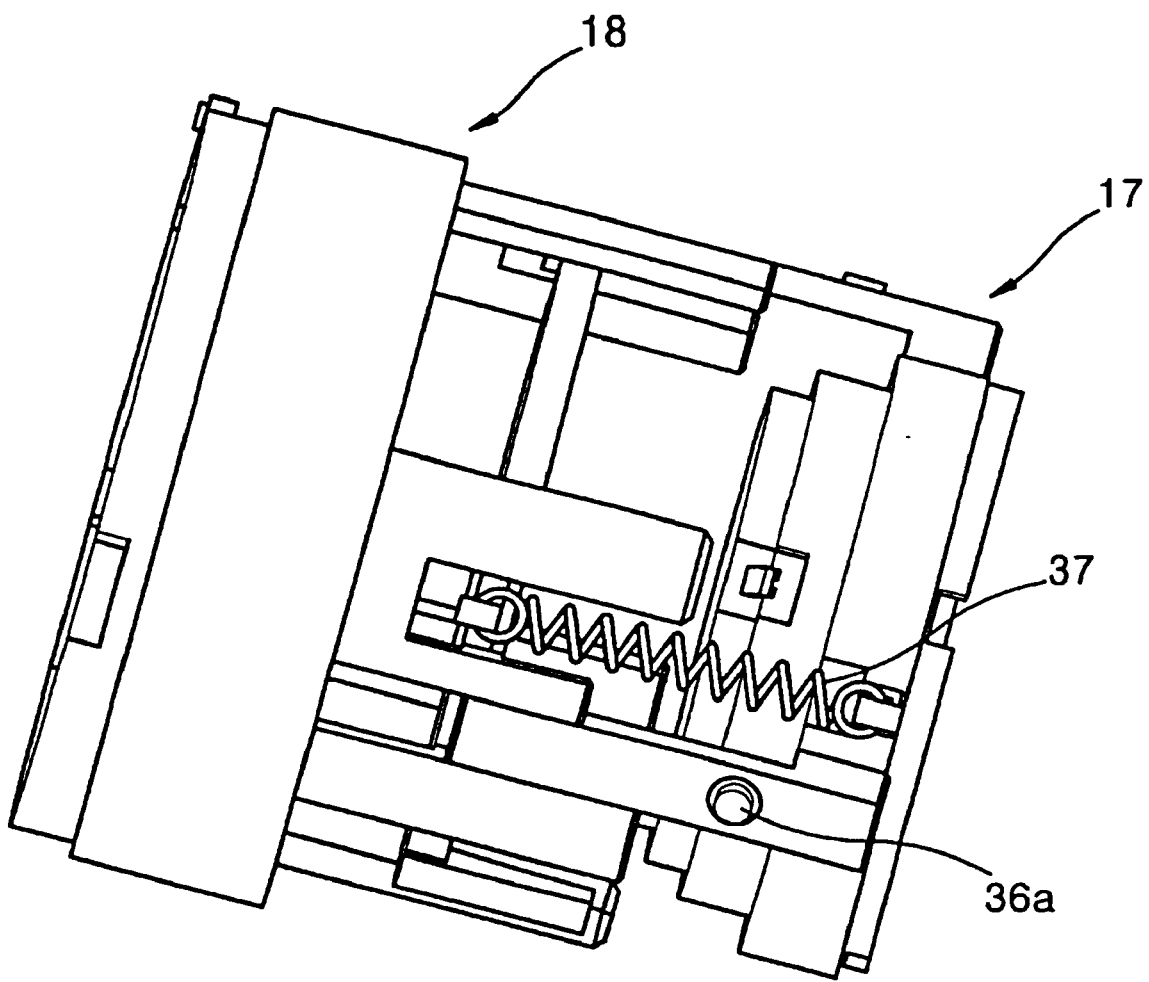
FIG. 7 is a side view showing the state in which the spring is installed between the rear lens frame and the front guide frame.
Figure 8:
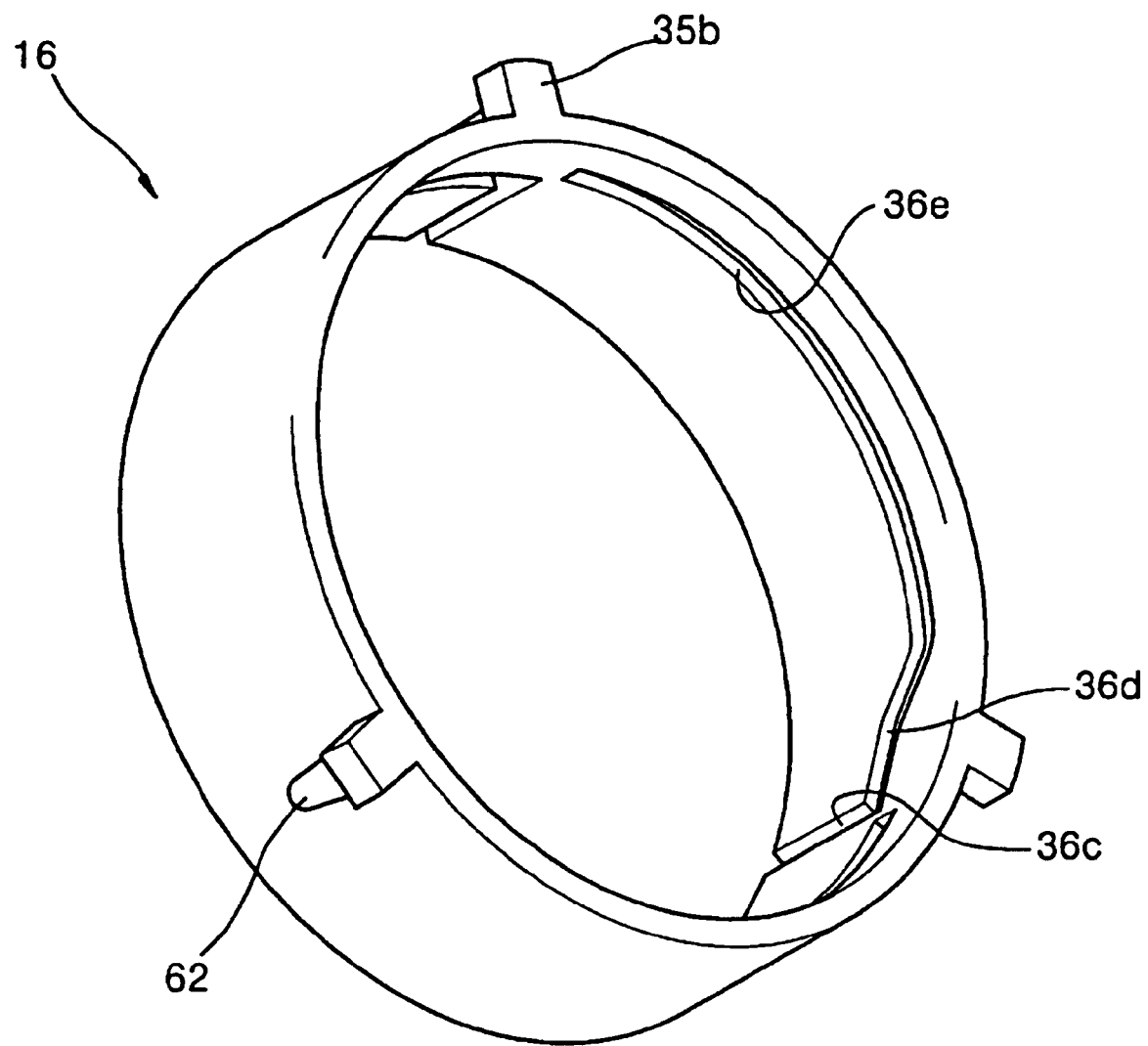
FIG. 8 is a magnified perspective view of the inner rotator.

A plurality of second guide pieces 18a are installed at the edge of the front guide frame 18 facing the film. A plurality of third guide pieces 17a extending toward the front guide frame 18 and coupled to a portion between the second guide pieces 18a to be capable of sliding, are formed at the rear lens frame 17. The first guide pieces 15a formed at the inner guide ring 15 are placed between the inner circumferential surface of the inner helicoid rig 14 and the third guide pieces 17a of the rear lens frame 17, and are coupled to the portion between the second guide pieces 18a of the first guide frame 18. End portions of a spring 37 for elastically biasing the front guide frame 18 and the rear lens frame 17 in the opposite directions are fixed to the front guide frame 18 and the rear lens frame 17, as shown in FIG. 7.

Figure 5:
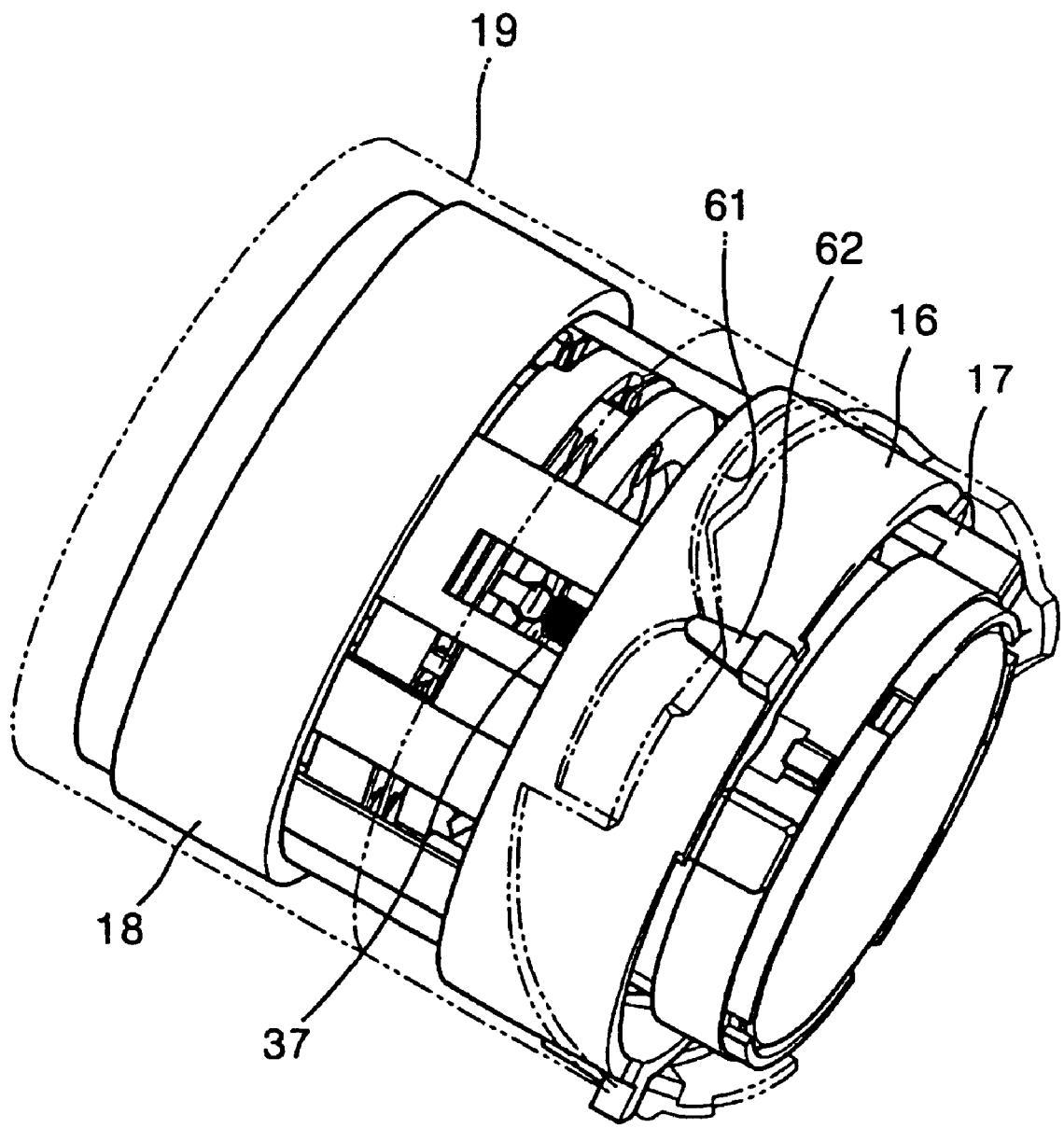
FIG. 5 is a partially cut-away perspective view showing a state in which the inner rotator and the zoom ring of the zoom camera are coupled.
Figure 6:
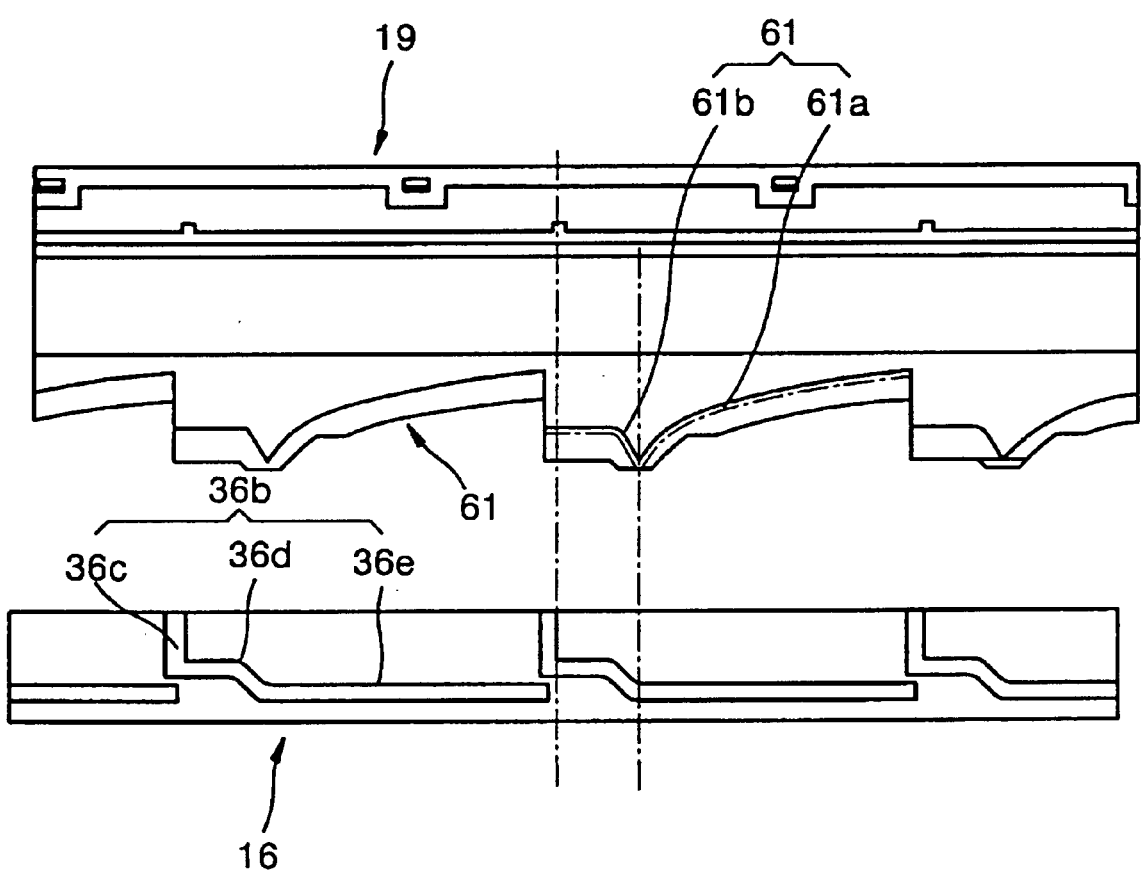
FIG. 6 is a development view of the cam groove formed in the inner rotator, and the cam portion formed at the zoom ring.

A cam unit 60 for advancing and retreating the inner rotator 16 during rotation of the inner helicoid ring 14 and the inner rotator 16 so that the rear lens frame 17 installed in the inner rotator 16 can linearly move in forward and backward directions, that is, the rear lens frame 17 advances and retreats with respect to the front guide frame 18 installed at the zoom ring 19, is installed at the inner helicoid ring 14 and the inner rotator 16. The cam unit 60 includes a cam portion 61 of a predetermined pattern formed on the inner circumferential surface of the zoom ring 19, and a protrusion 62 formed on the outer circumferential surface of the inner rotator 16 and moving along the cam portion 61, as shown in FIGS. 1, 5 and 6. An inner circumferential surface of the edge of the zoom ring 19, facing the film, of the cam portion 61 formed on the inner circumferential surface of the zoom ring 19 may be formed to be stepped.

The cam groove 36b formed in the inner circumferential surface of the inner rotator 16 includes an entrance section 36c for guiding entrance of the coupling protrusion 36a, an inclined section 36d connected to the entrance section 36c, and the intermediary section 36e extending from the inclined section 36d to be linear. The cam portion 61 formed on the zoom ring 19 includes a zoom section 61a corresponding to the intermediary section 36e of the cam groove 36b, and an accommodating section 61b inclined in the same direction as the inclined section 36d and in the opposite direction to the zoom section 61a, as shown FIG. 6.

Figure 3:
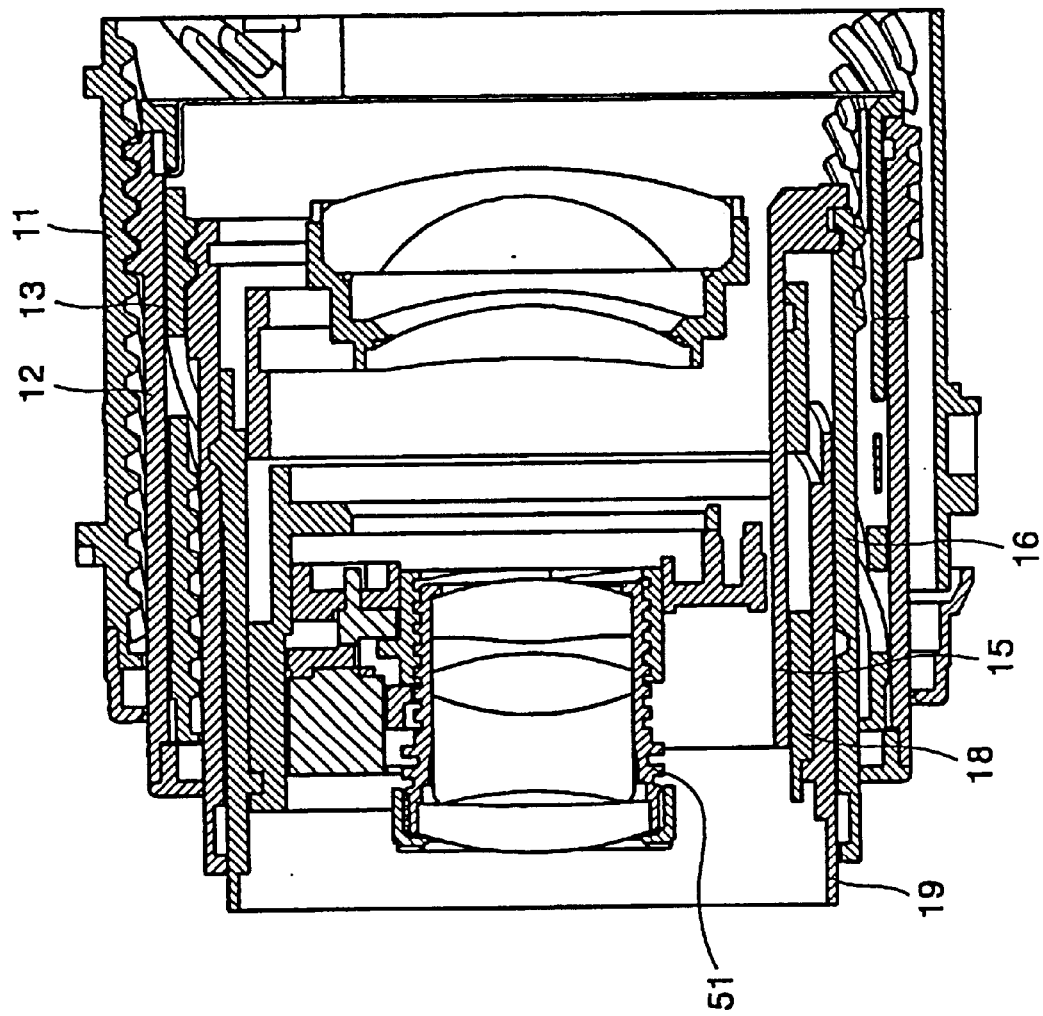
FIG. 3 is a sectional view showing the zoom camera in a wide mode.
Figure 4:
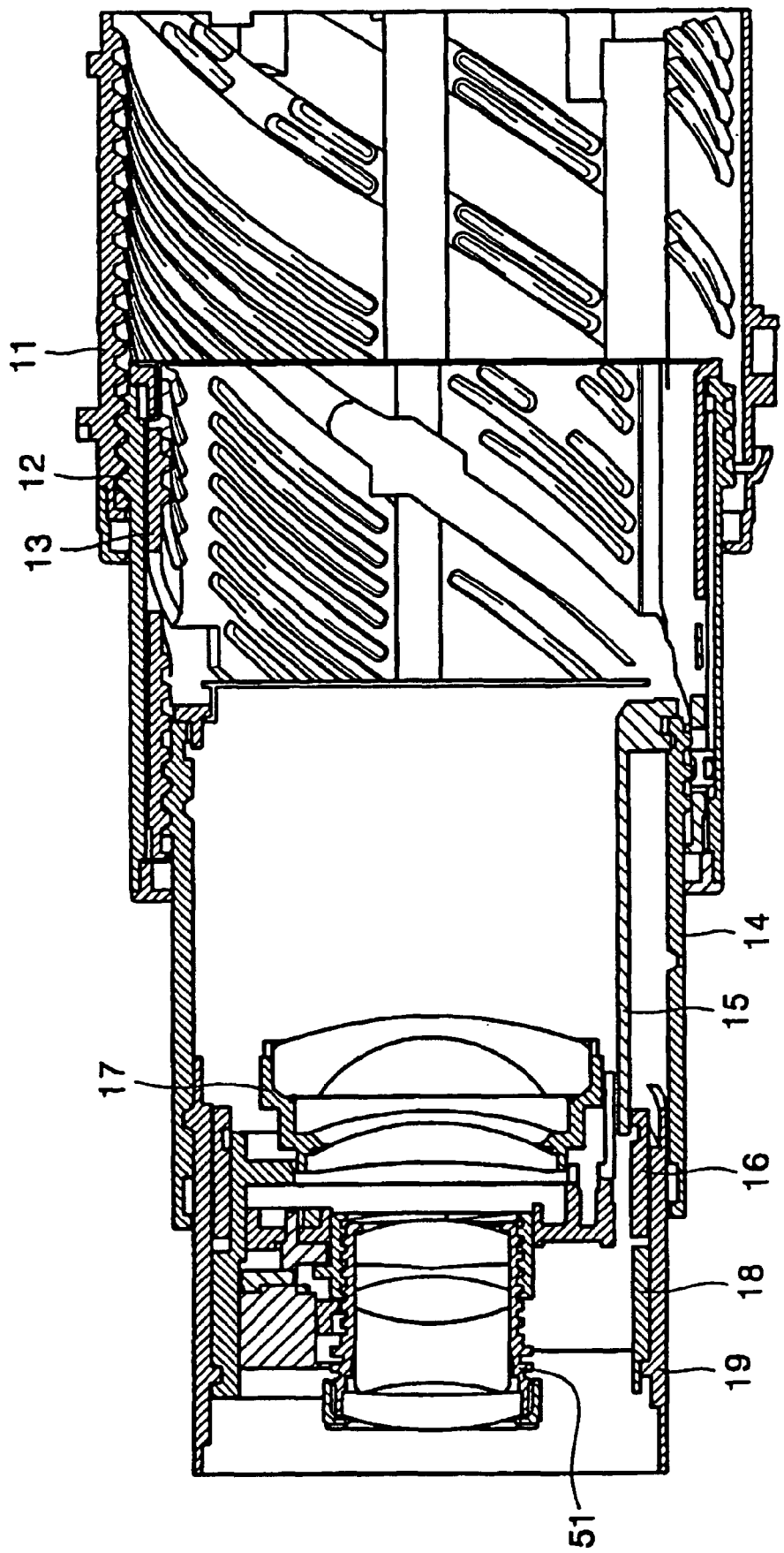
FIG. 4 is a sectional view showing the zoom camera in a telescopic mode.

In the operation of the barrel assembly of a zoom camera having above structure according to the present invention, when a user selects a telescopic mode, as shown in FIGS. 3 and 4, the helicoid ring 12 is rotated by the driving unit 100 of the barrel assembly 10. While rotating, the helicoid ring 12 advances with respect to the fixed barrel 11. Simultaneously, the guide ring 13 installed in the helicoid ring 12 linearly moves along the optical axis, not rotates, as the first guide protrusion 31b installed at the outer circumferential surface of the guide ring 13 that is the first guide unit 31 moves along the first guide groove 31a formed in the inner circumferential surface of the fixed barrel 11.

In this step, the inner helicoid ring 14 advances by being rotated by the second guide unit 32. That is, since the second guide protrusion 32a formed on the outer circumferential surface of the inner helicoid ring 14 is coupled to the second guide groove 32a formed in the inner circumferential surface of the helicoid ring 12 by passing through the slot 32b formed to be inclined in the outer circumferential surface of the guide ring 13, the helicoid ring 12 and the inner helicoid ring 14 are engaged with each other. Also, since the second guide protrusion 32c moves along the inclined slot 32b, the inner helicoid ring 14 advances while rotating from the guide ring 13.

As the inner helicoid ring 14 advances while rotating, the inner rotator 16 advances and retreats by the third advancing and retreating unit 34. At this time, since the front guide frame 18 installed at the zoom ring 19 is supported by the inner guide ring 15 which is advanced and retreated by the third guide unit 33 without being rotated, the zoom ring 19 advances without rotating. In detail, the helicoid female screw thread 34a formed on the inner circumferential surface of the inner helicoid ring 14 is engaged with the helicoid male screw thread 34b formed at the end portion of the zoom ring 19 facing the film. The second guide pieces 18a of the front guide frame 18, extending toward the film, are coupled to the first guide pieces 15a extending from the inner guide ring 15 to be capable of sliding. The third guide protrusions 33a protruding from the outer circumferential surface of the inner guide ring 15 is coupled with the third guide groove 33b formed in the inner circumferential surface of the guide ring 13. Thus, the zoom ring 19 advances without rotating when the inner helicoid ring 14 rotates.

In the above step, the inner rotator 16 coupled to the inner circumferential surface of the inner helicoid ring 14 by the fourth guide unit 35 rotates together with the inner helicoid ring 14. Thus, the inner rotator 16 coupled to the zoom ring 19 by the cam unit 60 moves toward the film. The rear lens frame 17 supported in the inner rotator 16 by the coupling unit 36, moves toward the film without rotating.

In detail, as the inner helicoid ring 14 rotates, the inner rotator 16 coupled by the fourth guide unit 35 is rotated. The coupling protrusion 36a formed on the outer circumferential surface of the rear lens frame 17 is coupled to the cam groove 36b formed in the inner circumferential surface of the inner rotator 16. Since the rear lens frame 17 is supported by the first guide pieces 15a of the inner guide ring 15, although the inner rotator 16 rotates, the rear lens frame 17 does not rotate. Since the protrusion 62 of the cam unit 60 formed on the outer circumferential surface of the inner rotator 16 moves along the zoom section 61a of the cam portion 61 formed to be inclined on the zoom ring 19 as the inner rotator 16 rotates, the inner rotator 16 and the rear lens frame 17 supported by the inner rotator 16 move overcoming a tension of the spring 37 connecting the front guide frame 18 and the rear lens frame 17, so that the rear lens frame 17 moves with respect to the front guide frame 18 installed in the zoom ring 19.

When a user selects a wide more in the current telescopic mode, the geared motor of the driving unit rotates reversibly and, in the reverse order to the above description, the front guide frame 18 where the front lens frame 51 is installed and the zoom ring 19 move with respect to the rear lens frame 17 where the rear lens group is installed. Thus, the current mode is changed to a wide mode.

In the above step, to prevent the rear lens frame 17 from colliding with the film during accommodation, the rear lens frame 17 is moved toward the front guide frame 18 by the coupling unit 36. That is, as shown in FIG. 6, since the accommodating section 61b inclined in the reverse direction with respect to the point of inflection of the zoom section 61a is formed at the cam portion 61 of the cam unit 60, and the inclined section 36d is formed at the cam groove 36b corresponding to the cam portion 61, the rear lens frame 17 advances toward an object to be photographed by a combination of these inclined sections. Thus, the accommodating section 61b of the cam portion 61 and the inclined section 36d of the cam groove 36b can be formed to be gradually. Furthermore, a load applied when driving of zooming can be reduced.

As described above, in the barrel assembly of a zoom camera according to the present invention, since the zoom ring is moved by the cam combination and the helicoid combination and the rear lens frame is moved by the cam unit, the front guide frame and the rear lens frame are moved together with the zoom ring. Thus, while zooming between the telescopic mode and the wide mode is performed, the interval between the front guide frame and the rear lens frame can be maintained uniformly. As the front lens group moves with respect to the fixed barrel, since a zoom stages are formed by adjusting the interval between the front lens group and the rear lens group, a high magnifying power can be obtained while achieving miniaturization. Also, a zoom lens which does not generate a point of inflection when the lens groups are moved can be realized.

It is noted that the present invention is not limited to the preferred embodiment described above, and it is apparent that variations and modifications by those skilled in the art can be effected within the spirit and scope of the present invention defined in the appended claims.

What is claimed is:

1. A barrel assembly of a zoom camera comprising:
   a front lens frame having a front lens group;
   a front guide frame for supporting the front lens frame;
   a zoom ring advancing and retreating along an optical axis of the front lens group;
   an inner helicoid ring installed to be capable of advancing and retreating with respect to the zoom ring;
   a rear lens frame having a rear lens group arranged on the same optical axis as the front lens group; and
   a cam unit formed at the zoom ring and an inner rotator installed at the inner helicoid ring to be capable of advancing and retreating for adjusting the interval between the front lens group and the rear lens group as the front lens group moves.

2. The barrel assembly as claimed in claim 1, wherein the cam unit comprises:
   a cam portion formed along an end portion of the zoom ring;
   a protrusion formed at the outer circumferential surface of the inner rotator which is coupled to the inner helicoid ring by a guide unit and contacting the cam portion; and
   a coupling unit installed at the inner rotator and the rear lens frame for advancing and retreating the rear lens frame with respect to the front guide frame.

3. The barrel assembly as claimed in claim 2, wherein the coupling unit comprises:
   a coupling protrusion formed on the outer circumferential surface of the rear lens frame and
   a cam groove formed along the inner circumferential surface of the inner rotator to be coupled to the coupling protrusion.

4. The barrel assembly as claimed in claim 3, wherein:
   the cam groove comprises:
      an entrance section for guiding entrance of the coupling protrusion;
      an inclined section connected to the entrance section; and
      an intermediary section linearly extending from the inclined section; and
   the cam portion comprises:
      a zoom section corresponding to the intermediary section and
      an accommodating section formed at a portion corresponding to the inclined section to be inclined in a direction that is the same as the inclined section and opposite to the zoom section.

5. The barrel assembly as claimed in claim 4, wherein a spring for elastically biasing the front guide frame and the rear lens frame in the opposite directions is installed between the front guide frame and the rear lens frame.

6. A barrel assembly of a zoom camera comprising:
   a front lens frame having a front lens group;
   a front guide frame for supporting the front lens frame;
   a zoom ring having a cam portion formed along an end portion of the zoom ring;
   a rear lens frame having a rear lens group arranged on the same optical axis as the front lens group;
   an inner helicoid ring coupled to the zoom ring by an advancing and retreating unit;
   an inner rotator advancing and retreating in a lengthwise direction by a guide unit along the inner circumferential surface of the inner helicoid ring;
   a cam unit installed at the outer circumferential surface of the inner rotator and the zoom ring for advancing and retreating the inner rotator during rotation of the inner helicoid ring and including a coupling unit formed on the inner circumferential surface of the inner rotator and the outer circumferential surface of the rear lens frame for advancing and retreating the rear lens frame during the rotation of the inner rotator; and
   an inner guide ring coupled to the front guide frame and the rear lens frame to be capable of sliding for preventing the front guide frame and the rear lens frame from rotating.

7. The barrel assembly as claimed in claim 6, wherein the advancing and retreating unit comprises:
   a helicoid female screw thread formed on the inner circumferential surface of the inner helicoid ring and
   a helicoid male screw thread formed on the outer circumferential surface of the zoom ring.

8. The barrel assembly as claimed in claim 6, wherein:
   the cam unit comprises:
      a cam portion formed along an end portion of the zoom ring and
      a protrusion formed on the outer circumferential surface of the inner rotator coupled by the inner helicoid ring and the guide unit and contacting the cam portion; and
   the coupling unit comprises:
      a guide protrusion formed on the outer circumferential surface of the rear lens frame and
      a cam groove formed in the inner circumferential surface of the inner rotator to be coupled to the coupling protrusion.

9. The barrel assembly as claimed in claim 8, wherein:
   the cam groove comprises:
      an entrance section for guiding entrance of the coupling protrusion;
      an inclined section connected to the entrance section; and
      an intermediary section linearly extending from the inclined section; and
   the cam portion comprises:
      a zoom section corresponding to the intermediary section and
      an accommodating section formed at a portion corresponding to the inclined section to be inclined in a direction that is the same as the inclined section and opposite to the zoom section.

10. The barrel assembly as claimed in claim 6, wherein the front guide frame, the rear lens frame, and the inner guide ring are coupled to one another by first guide pieces formed on the outer circumferential surfaces of the front guide frame and the rear lens frame at a predetermined interval, and second guide pieces formed on the outer circumferential surface of the inner guide ring and inserted between the first guide pieces.

11. The barrel assembly as claimed in claim 6, wherein a spring for elastically biasing the front guide frame and the rear lens frame in the opposite directions is installed between the front guide frame and the rear lens frame.

12. The barrel assembly as claimed in claim 11, wherein the front guide frame, the rear lens frame, and the inner guide ring are coupled to one another by first guide pieces formed on the outer circumferential surfaces of the front guide frame and the rear lens frame at a predetermined interval, and second guide pieces formed on the outer circumferential surface of the inner guide ring and inserted between the first guide pieces.

13. A barrel assembly of a zoom camera comprising:
   a front lens frame having a front lens group;
   a front guide frame for supporting the front lens frame;
   a zoom ring having a cam portion formed along an end portion of the zoom ring;
   a rear lens frame having a rear lens group arranged on the same optical axis as the front lens group;
   an inner helicoid ring coupled to the zoom ring by an advancing and retreating unit;
   an inner rotator advancing and retreating in a lengthwise direction by a first guide unit along the inner circumferential surface of the inner helicoid ring;
   a cam unit installed at the outer circumferential surface of the inner rotator and the zoom ring for advancing and retreating the inner rotator during rotation of the inner helicoid ring and including a coupling unit formed on the inner circumferential surface of the inner rotator and the outer circumferential surface of the rear lens frame for advancing and retreating the rear lens frame during the rotation of the inner rotator;
   an inner guide ring coupled to the front guide frame and the rear lens frame to be capable of sliding for preventing the front guide frame and the rear lens frame from rotating;
   a guide ring coupled to the inner guide ring to be capable of advancing and retreating by a second guide unit;
   a helicoid ring in which the guide ring is rotatably inserted and coupled to the inner helicoid ring by a third guide unit for advancing and retreating the inner helicoid ring while rotating the inner helicoid ring during rotation of the helicoid ring; and
   a driving unit for driving the helicoid ring.

14. The barrel assembly as claimed in claim 13, wherein the advancing and retreating unit comprises:
   a helicoid female screw thread formed on the inner circumferential surface of the inner helicoid ring and
   a helicoid male screw thread formed on the outer circumferential surface of the zoom ring.

15. The barrel assembly as claimed in claim 13, wherein:
   the cam unit comprises:
      a cam portion formed along an end portion of the zoom ring and
      a protrusion formed on the outer circumferential surface of the inner rotator coupled by the inner helicoid ring and the guide unit and contacting the cam portion; and
   the coupling unit comprises:
      a guide protrusion formed on the outer circumferential surface of the rear lens frame and
      a cam groove formed in the inner circumferential surface of the inner rotator to be coupled to the coupling protrusion.

16. The barrel assembly as claimed in claim 15, wherein:
   the cam groove comprises:
      an entrance section for guiding entrance of the coupling protrusion;
      an inclined section connected to the entrance section; and
      an intermediary section linearly extending from the inclined section; and
   the cam portion comprises:
      a zoom section corresponding to the intermediary section and
      an accommodating section formed at a portion corresponding to the inclined section to be inclined in a direction that is the same as the inclined section and opposite to the zoom section.

17. The barrel assembly as claimed in claim 13, wherein the third guide unit comprises a guide protrusion formed on the outer circumferential surface of the inner helicoid ring and the guide protrusion is coupled to a guide groove formed on the inner circumferential surface of the helicoid ring in a lengthwise direction by passing through a slot formed in the outer circumferential surface of the guide ring.

* * * * *